July 7, 1970
G. A. SLEEGE
3,519,822
TIME OF FLIGHT TO KINETIC ENERGY CONVERTER FOR A NUCLEAR PARTICLE SPECTROMETER
Filed Aug. 10, 1967
3 Sheets-Sheet 1
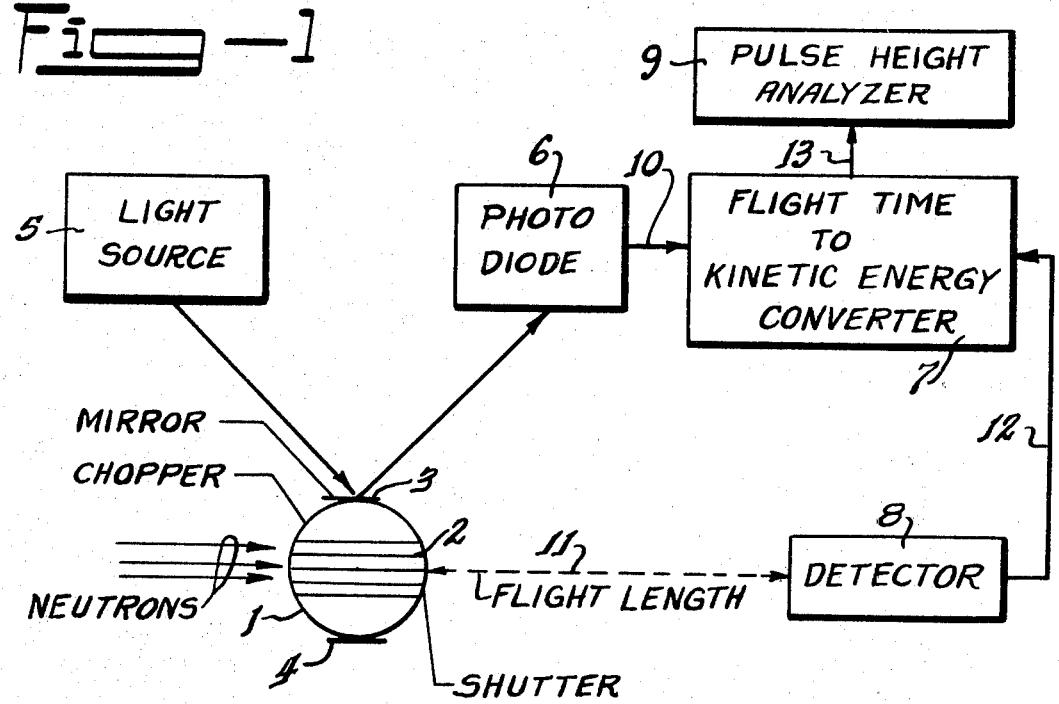
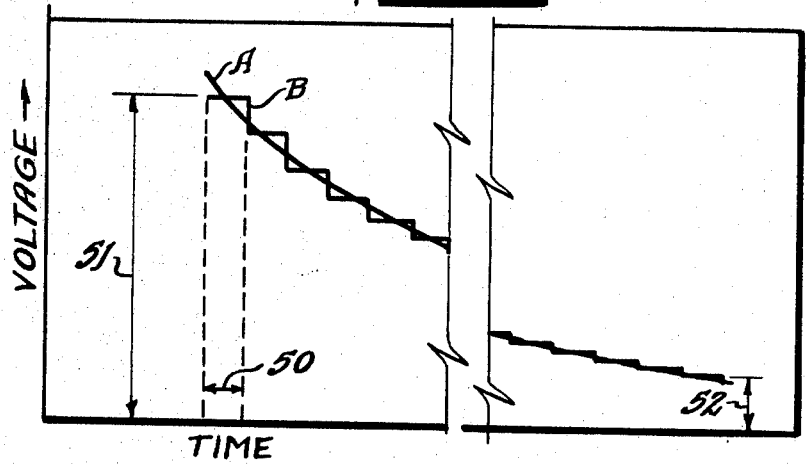
INVENTOR.
Gary A. Sleege
BY
Attorney

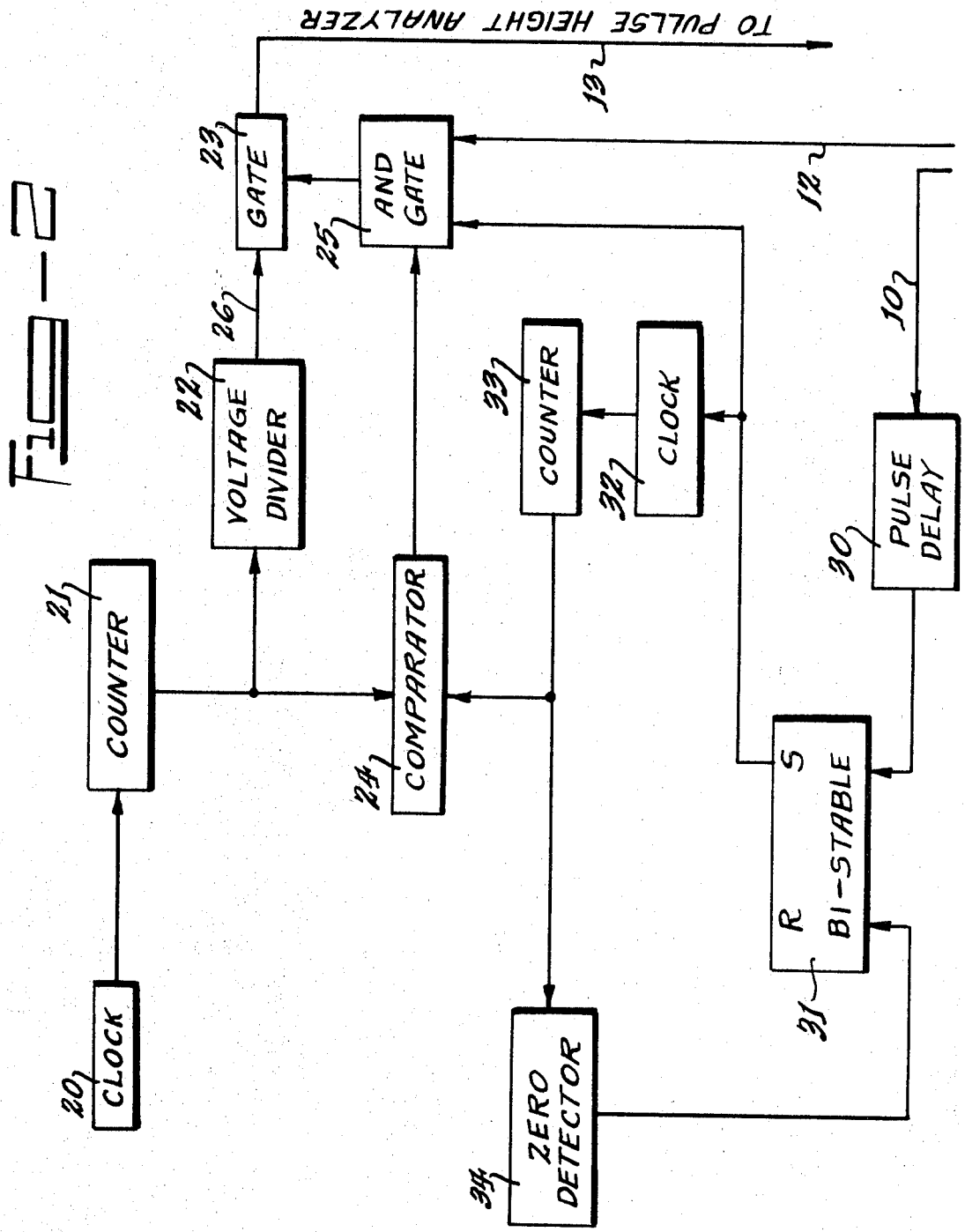

Fig-3

United States Patent Office

3,519,822
Patented July 7, 1970

3,519,822
TIME OF FLIGHT TO KINETIC ENERGY CONVERTER FOR A NUCLEAR PARTICLE SPECTROMETER
Gary A. Sleege, Ames, Iowa, assignor to the United States of America as represented by the United States Atomic Energy Commission
Filed Aug. 10, 1967, Ser. No. 660,883
Int. Cl. H01j *39/32*
U.S. Cl. 250—83.1                                    4 Claims

ABSTRACT OF THE DISCLOSURE

A device for converting the time of flight, $t$, of nuclear particles of mass $m$ over a distance, D, into a voltage having a magnitude proportional to the kinetic energy of the nuclear particles. A voltage generator synchronized with the start of the time of flight of the nuclear particles produces a voltage proportional to $\frac{1}{2}mD^2/t^2$. This voltage is sampled and stored in a pulse height analyzer at the end of the time of flight of a nuclear particle.

CONTRACTUAL ORIGIN OF THE INVENTION

The invention described herein was made in the course of, or under, a contract with the United States Atomic Energy Commission.

BACKGROUND OF THE INVENTION

This invention relates to time-of-flight spectrometers and particularly to spectrometers which convert nuclear particle time of flight measurements to kinetic energy spectra.

The determination of the kinetic energy spectrum of nuclear particles in a beam is usually made by measuring and storing the beam density as a function of time over a suitable time interval and subsequently converting the stored measurements to a kinetic energy spectrum. A device implementing this technique typically includes a nuclear particle detector, a chopper placed at a predetermined distance, D, from the detector between the source of the beam of particles and the detector, and a recorder connected to the detector output. The chopper periodically interrupts the beam of nuclear particles to provide a "zero" reference base wherefrom nuclear particles of different energies become spread out over the distance between the chopper and the detector due to their different times of flight, $t$. The recorder stores the detector output as a function of time. By synchronizing the chopper and the recorder a functional relationship between the nuclear particles in the beam and their time of flight during the time periods between interruptions of the beam may be obtained. From this relationship the kinetic energy spectrum of the particles in the beam may be calculated using the relation $E=\frac{1}{2}\,mv^2$, where $m$ is the mass of the nuclear particles and $v$, the velocity of the nuclear particles, is equal to $D/t$.

It is an object of the present invention to provide means for converting the flight time of nuclear particles in a beam into a physical quantity having a magnitude proportional to the kinetic energy of the nuclear particles.

It is another object of the present invention to provide means for obtaining a kinetic energy spectrum of nuclear particles in a beam.

It is still another object of the present invention to provide means for obtaining the kinetic energy spectrum of nuclear particles having kinetic energies within a predetermined range.

It is still another object of the present invention to provide means for converting the flight time of nuclear particles in a beam into a voltage having a magnitude proportional to the kinetic energy of the nuclear particles.

SUMMARY OF THE INVENTION

In accordance with the invention a mechanical chopper is placed between a source emitting a beam of nuclear particles having various kinetic energies and a nuclear particle detector. The mechanical chopper is used as a gate allowing the nuclear particles to begin at the same time their flight to the detector from the chopper.

A first binary counter is provided and responsive to the gating action of the chopper advances from its initial count of zero to the highest count it can contain in a time interval equal to the longest time of flight of the nuclear particles within a preselected range of energies.

A second binary counter, having the same number of binary stages as the first counter, is continuously advanced at a rate several orders of magnitude slower than the rate of advance of the first counter.

Both counters are reset to the count of zero upon reaching their highest count.

Means are provided which responsive to the output of the second counter generate a stair-step voltage which approximates the function $K/t^2$, where K is a proportionality constant and $t$ is the time for the second counter to advance from the count of zero to the highest count it can contain.

The stair-step voltage is fed to the input of a gate which is opened in response to time coincidence between the arrival of a nuclear particle at the detector and equality between the counts in the first and second counters. A pulse height analyzer stores the output of the gate, which output represents a voltage proportional to the kinetic energy of the detected nuclear particle.

BRIEF DESCRIPTION OF THE DRAWINGS

A more complete understanding of the invention will best be obtained from consideration of the accompanying drawings in which:

FIG. 1 is a diagram illustrating the general embodiment of an apparatus for the practice of the present invention.

FIG. 2 is a detailed block diagram of the Flight Time to Energy Converter for the embodiment of FIG. 1.

FIG. 3 is a schematic diagram of the voltage divider circuit in FIG. 2.

FIG. 4 is a graph illustrating a portion of the operation of the embodiment of FIG. 2.

PREFERRED EMBODIMENT OF THE INVENTION

In FIG. 1, a beam of nuclear particles such as a collimated beam of neutrons having various kinetic energies is directed towards a mechanical chopper 1. For purposes of illustration of the present invention, a neutron beam is utilized.

The chopper 1 is cylindrically shaped and includes a shutter 2 comprising layers of material which are transparent to neutrons. As the chopper 1 is rotated the shutter 2 allows neutrons to pass through the chopper twice every revolution.

A light source 5 emits a beam of light toward the chopper 1. Two mirrors 3 and 4 mounted on chopper 1 and spaced 180° apart reflect the beam of light from the light source 5 to a photo diode 6 each time the shutter 2 passes neutrons through the chopper 1. The photo diode 6 generates an output pulse in response to the reflected light beam. The output pulse from the photo diode 6 is fed to a Flight Time to Energy Converter 7 via line 10.

A detector 8 located at the end of the flight length 11 generates an output pulse when struck by a neutron. The output pulse from the detector 8 is fed to the Flight Time to Energy Converter 7 via line 12.

The Flight Time to Energy Converter 7 converts the time between the occurrence of the output pulse of the photo diode 6 and the time a neutron is detected by the detector 8, i.e., the flight time of the detected neutron, into a voltage value which is directly proportional to the kinetic energy of the detected neutron.

The voltage output of the Flight Time to Energy Converter 7 is fed, via line 13, to the input of a conventional pulse height analyzer.

Reference is now made to FIG. 2 for a detailed description of the Flight Time to Energy Converter 7 in FIG. 1.

The input of a manually adjustable pulse delay circuit 30 is connected via line 10 to the output of the photo diode 6 in FIG. 1. The output of the pulse delay 30 is coupled to the set input of a bistable circuit 31.

Output clock pulses of a manually adjustable clock 32 advance a conventional five stage flip-flop counter 33 in response to the set state of the bistable 31. When all flip-flop stages of the counter 33 are in the set state, i.e., when the counter 33 has been advanced to the highest count it can contain (31 counts for the present embodiment), an output clock pulse from clock 32 resets all the counter stages.

The set and reset outputs of the counter 33 are connected to a first set of inputs of a comparator 24 and to the inputs of a zero detector 34. The zero detector 34 includes a matrix of AND gates and generates an output pulse when the counter 33 is reset. The output of the zero detector 34 is coupled to the reset input of the bistable circuit 31.

Output pulses of a second manually adjustable clock 20 advance a conventional five stage flip-flop counter 21. Similar to the counter 33, the counter 21 is reset by an output pulse from clock 20 when it has been advanced to the highest count it can contain which is for the present embodiment 31 counts.

The set and reset outputs of the counter 21 are connected to a second set of inputs of the comparator 24 and to the inputs of a voltage divider 22. The voltage divider 22 generates a stair-step voltage waveform in response to the output of the counter 21 as hereinafter described.

The comparator 24 includes a matrix of AND gates which detect equality between the counts in the counter 21 and the counter 33.

The three inputs of an AND gate 25 are connected to the set output of the bistable 31, the output of the comparator 24, and the output of the detector 8 in FIG. 1 via line 12. The output of the AND gate 25 opens a gate 23 in response to time coincidence of the set state of the bistable 31, equality between the counts in the counters 21 and 33, and an output pulse from the detector 8 in FIG. 1.

The gate 23, when opened by the output of the AND gate 25, passes the output voltage of the voltage divider 22 via line 13 to the input of the pulse height analyzer 9 in FIG. 1. The pulse height analyzer 9 stores the voltage at its input in a location determined by the magnitude of the input voltage.

Figure 3:
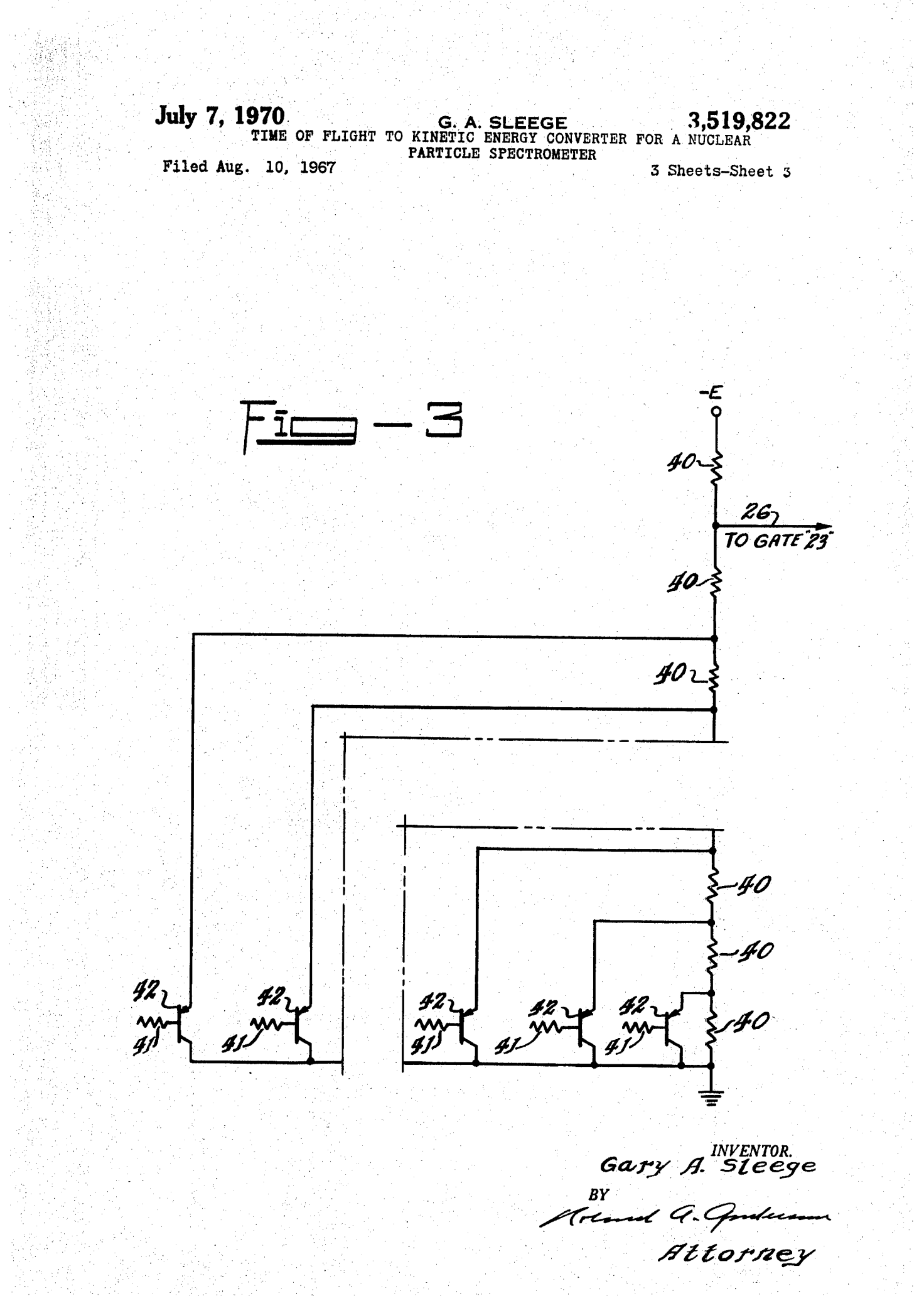

FIG. 3 is a schematic diagram of the voltage divider 22 in FIG. 2. The voltage divider includes thirty-one switching transistors 42 and thirty-three resistors 40 connected in series between a constant source of voltage-E and a reference ground potential.

The switching transistors 42 operate in their saturation and cut-off modes. A low DC saturation resistance and a high cut-off resistance are obtained by using the transistors 42 in their inverted configuration with the collector and emitter interchanged. The base and the collector then serve as the base and the emitter, respectively.

The outputs of the counter stages of the counter 21 are connected via a decoder (not shown) to transistor input resistors 41 so that the thirty-one transistors turn on in sequence in response to the sequential counts of 1 to 31 in the counter 21, thereby generating a stair-step voltage on line 26 having a total of 32 steps each time the counter 21 advances from the count of zero to the count of 31.

The resistance values of the resistors 40 are chosen such that the stair-step voltage appearing on line 26 when the transistors 42 turn on in sequence will approximate the function $k/t^2$, where $k$ is a proportionality constant and $t$ is the time of flight of the neutrons.

In FIG. 4 there is shown a graphical representation of the output voltage on line 26 of the voltage divider in FIG. 3. Curve A represents the function $k/t^2$, where $k$ and $t$ are as defined hereinbefore. Curve B represents the stair-step approximation to the curve A generated by the voltage divider on line 26 in FIG. 3.

The width of each step 50 of the curve B is equal to the time between successive clock pulses from clock 20 which advance the counter 21 in FIG. 2, since successive steps of the stair-step approximation are generated in response to successive counts in the counter 21 as hereinbefore described.

The magnitude of the first step of the curve B, indicated by reference numeral 51, corresponds to a count of zero in the counter 21 in FIG. 2; the magnitude of the last or thirty-second step, indicated by reference numeral 52, corresponds to a count of 31 in the counter 21.

Before operation, a range of flight times of the neutrons corresponding to a range of neutron energies is selected. The pulse delay circuit 30 in FIG. 2 is adjusted so that the output pulse of the photo diode 6 in FIG. 2 is delayed by a time interval equal to the shortest time of flight in the selected range of flight times. The clock 32 in FIG. 2 is adjusted so that its output will advance the counter 33 from its initial count of zero to its highest count of 31 in a time interval equal to the longest time of flight in the selected range of flight times. The clock 20 in FIG. 2 is adjusted such that its output will advance the counter 21 by one count after several revolutions of the chopper 1 in FIG. 1. The number of revolutions being selected to give a desired statistical average in the number of times a range of flight times is converted.

In operation, each time the shutter 2 in FIG. 1 allows neutrons to pass the chopper 1 a pulse is generated by the photo diode 6 in response to the light source 5. The output pulse of the photo diode 6 is delayed by the pulse delay circuit 30 in FIG. 2. The delayed output pulse of the pulse delay circuit 30 sets the bistable circuit 31 thereby starting the clock 32 which advances the counter 33.

A neutron detected by the detector 8 in FIG. 1 during equality between the counts in counters 21 and 33 in FIG. 2 opens the gate 23 since there is time coincidence between the three inputs to the AND gate 25. The gate 23 passes the output voltage of the voltage divider 22, which has a magnitude proportional to the kinetic energy of the detected neutron, to the input of the pulse height analyzer 9 in FIG. 1. The pulse height analyzer 9 stores the voltage at its input in a location determined by the magnitude of the input voltage.

As the counter 21 advances, the time of flight of neutrons in the selected range of flight times will be converted to a voltage value which is proportional to their kinetic energy. The output of the Flight Time to Energy Converter 7 which is stored in the pulse height analyzer 9 relates the number of neutrons versus the kinetic energy of these particles.

Persons skilled in the art will, of course, readily adapt the general teachings of the invention to embodiments other than the specific embodiment illustrated. Accordingly, the scope of the protection afforded the invention should not be limited to the particular embodiment shown in the drawings and described above, but shall be determined only in accordance with the appended claims.

The embodiments of the invention in which an exclusive property or privilege is claimed are defined as follows:

1. In a spectrometer for determining the energies of nuclear particles contained in a beam and including means for periodically interrupting said nuclear particle beam and nuclear-particle-detecting means spatially mounted a predetermined distance from said beam-interrupting means to detect nuclear particles in said beam, the combination with means for generating a voltage proportional in amplitude to $1/t^2$, where $t$ is the time required for said nuclear particle to traverse said predetermined distance, a pulse height analyzer and means responsive to said nuclear-particle-detecting means for gating the output of said voltage-generating means to the input of said pulse height analyzer.

2. A spectrometer for determining the energies of nuclear particles in a beam within a predetermined range of energies and including means for periodically interrupting said nuclear particle beam and nuclear-particle-detecting means spatially mounted a predetermined distance from said beam-interrupting means to detect nuclear particles in said beam comprising means for generating a pulse in response to said particle beam interrupting means;
means for delaying said pulse for a predetermined time; first and second counter means;
means for continuously advancing said first counter means at a first predetermined rate;
means for advancing said second counter means at a second predetermined rate in response to the output of said pulse delay means;
comparison means for detecting equality between the outputs of said first and second counter means;
means responsive to the output of said first counter means for generating a voltage proportional in amplitude to $1/t^2$, where $t$ is the time required for said nuclear particles having energies within said predetermined range of energies to traverse said predetermined distance;
a pulse height analyzer; and
means responsive to time coincidence of the output of said comparison means and the output of said nuclear-particle-detecting means for gating the output of said voltage generating means to the input of said pulse height analyzer.

3. The device according to claim 2 wherein the delay time of said pulse delay means is equal to the shortest time for said nuclear particles within said predetermined range of energies to traverse said predetermined distance.

4. The device according to claim 2 wherein said second counter is advanced from a first predetermined count to a second predetermined count in a time equal to the longest time for said nuclear particles within said predetermined range of energies to traverse said predetermined distance.

References Cited

UNITED STATES PATENTS

| | | | |
|---|---|---|---|
| 2,305,452 | 12/1942 | Kallman et al. | 250—83.1 X |
| 2,524,379 | 10/1950 | Fermi | 250—83.1 |
| 3,270,205 | 8/1966 | Ladd et al. | 250—83.1 X |

ARCHIE R. BORCHELT, Primary Examiner

A. L. BIRCH, Assistant Examiner

U.S. Cl. X.R.
250—41.9